United States Patent [19]

Cody et al.

[11] Patent Number: 5,290,426

[45] Date of Patent: Mar. 1, 1994

[54] HIGH POROSITY, HIGH SURFACE AREA ISOMERIZATION CATALYST AND ITS USE

[75] Inventors: Ian A. Cody, Clearwater; David H. Dumfries, Sarnia - Clearwater, both of Canada; Arthur H. Neal; Kenneth L. Riley, both of Baton Rouge, La.

[73] Assignee: Exxon Research and Engineering Company, Florham Park, N.J.

[21] Appl. No.: 932,529

[22] Filed: Aug. 20, 1992

Related U.S. Application Data

[62] Division of Ser. No. 699,101, May 10, 1991, Pat. No. 5,182,248.

[51] Int. Cl.$^5$ .................. C10G 25/00; C10G 73/02
[52] U.S. Cl. ................................. 208/27; 208/24; 208/28; 208/89; 585/737; 585/749
[58] Field of Search ............... 585/737, 749; 208/27, 208/24, 28, 89

[56] References Cited

U.S. PATENT DOCUMENTS

| | | | |
|---|---|---|---|
| 2,668,866 | 2/1954 | Good et al. | 260/683.5 |
| 2,838,444 | 6/1958 | Teter et al. | 196/50 |
| 3,121,696 | 2/1964 | Hoekstra | 252/441 |
| 3,123,573 | 3/1964 | Carr | 252/442 |
| 3,206,525 | 9/1965 | Michaels et al. | 260/683.66 |
| 3,268,439 | 8/1966 | Tupman et al. | 208/112 |
| 3,308,052 | 3/1967 | Ireland et al. | 208/27 |
| 3,365,390 | 1/1968 | Egan | 208/60 |
| 3,486,993 | 12/1969 | Egan et al. | 208/89 |
| 3,692,697 | 9/1972 | Kravitz et al. | 252/439 |
| 3,709,817 | 1/1973 | Suggitt et al. | 208/112 |
| 3,794,580 | 2/1974 | Ladeur | 208/110 |
| 3,830,723 | 8/1974 | Ladeur et al. | 208/108 |
| 3,963,601 | 6/1976 | Hilfman | 208/111 |
| 4,472,529 | 9/1984 | Johnson et al. | 502/228 |
| 4,588,701 | 5/1986 | Chiang et al. | 502/65 |
| 4,906,601 | 3/1990 | Cody et al. | 502/230 |
| 4,923,588 | 5/1990 | Cody et al. | 208/27 |
| 4,923,841 | 5/1990 | Hamner et al. | 502/230 |

FOREIGN PATENT DOCUMENTS

| | | | |
|---|---|---|---|
| 1493928 | 11/1977 | United Kingdom | C10G 23/16 |
| 1499570 | 2/1978 | United Kingdom | C10G 34/00 |
| 9117825 | 11/1991 | World Int. Prop. O. | B01J 27/13 |

*Primary Examiner*—Helane Myers
*Attorney, Agent, or Firm*—Joseph J. Allocca

[57] ABSTRACT

A novel, high porosity, high surface area catalyst is disclosed which is useful in wax isomerization processes, especially for the production of high viscosity index, low pour point lubricating oil base stocks or blending stocks. The catalyst contains a catalytically active metal component selected from the group consisting of Group VIB and Group VIII metals, and mixtures thereof, preferably Group VIII metals, and mixtures thereof, more preferably noble Group VIII metals and mixtures thereof, most preferably platinum which catalytically active metal component is present in the range of about 0.01 to 5.0 wt %, and a fluorine content in the range of about 0.01 to about 10.0. The catalyst employs a refractory metal oxide support material, one preferably predominantly (i.e., at least 50 wt %) alumina, most preferably completely alumina, e.g., gamma or eta alumina. The finished catalyst has a porosity, expressed in terms of pore volume, of at least about 0.50 cc/gram and a surface area such that when the porosity is multiplied by the surface area the product obtained is at least about 107, preferably at least about 110, more preferably at least about 115, most preferably at least about 120.

14 Claims, No Drawings

HIGH POROSITY, HIGH SURFACE AREA ISOMERIZATION CATALYST AND ITS USE

This application is a divisional of U.S. Ser. No. 07/699,101 filed May 10, 1991 now U.S. Pat. No. 5,182,248.

BRIEF DESCRIPTION OF THE INVENTION

A novel, high porosity, high surface area catalyst is disclosed which is useful in wax isomerization processes, especially for the production of high viscosity index, low pour point lubricating oil base stocks or blending stocks. The catalyst contains a catalytically active metal component selected from the group consisting of Group VIB and Group VIII metals, and mixtures thereof, preferably Group VIII metals, and mixtures thereof, more preferably noble Group VIII metals and mixtures thereof, most preferably platinum, which catalytically active metal component is present in the range of about 0.01 to 5.0 wt %, preferably about 0.1 to 1 wt % and a fluorine content in the range of about 0.01 to about 10.0 wt %, preferably about 0.1 to 2.0 wt %. The catalyst employs a refractory metal oxide support material, one preferably predominantly (i.e., at least 50 wt %) alumina, most preferably completely alumina, e.g., gamma or eta alumina. The finished catalyst has a porosity, expressed in terms of pore volume, of at least about 0.50 cc/gram preferably at least about 0.55 cc/gm, more preferably at least about 0.65 cc/gm and a surface area (in m$^2$/g) such that the product of the porosity (in cc/gm) and the surface area (in m$^2$/g) is at least about 107, preferably at least about 110, more preferably at least about 115, most preferably at least about 120.

The catalyst isomerizes wax in high yield into liquid products, preferably high viscosity index, low pour point lube oil base stocks and blending stocks.

BACKGROUND OF THE INVENTION

Isomerization of wax over catalyst comprising a Group VIII metal, usually platinum support on a fluorided alumina base which has long been practiced.

U.S. Pat. No. 2,668,866 teaches the isomerization of wax using a supported platinum catalyst. The support is preferably an alkali free alumina which has been treated with HCl or HF prior to the incorporates of the platinum.

U.S. Pat. No. 3,308,052 also teaches wax isomerization involving the maximization of jet fuel by careful control of the level of conversion. The catalyst used is a halogen promoted platinum type catalyst.

U.S. Pat. No. 3,365,390 teaches the production of lubricating oil by hydrocracking a heavy oil feed, separating hydrocracked wax from the hydrocracked lube oil portion, and hydroisomerizing the hydrocracked wax using an active reforming catalyst. Active reforming catalysts include platinum-alumina reforming catalyst containing from 0 to 1 wt % halide. Catalysts containing upwards of 2 wt % halide are too acidic.

U.S. Pat. Nos. 4,906,601 and 4,923,588 teach a small particle size low fluorine content catalyst and the use of said catalyst for the isomerization of wax into lube oil base stocks or blending stocks. The catalyst comprises a noble Group VIII metal on fluorided alumina wherein the fluoride content is less than 2 wt % and the support has a particle diameter of less than 1/16 inch. In U.S. Pat. No. 4,923,588 eight catalysts are described by example. Pore volumes and surface areas are not recited.

GB 1,499,570 teaches a method for improved white mineral oil production. A catalyst is described for use in the second step comprising a support, palladium and a halogen. The support is a refractory metal oxide such as alumina having a surface area of 25 to 600 m$^2$/gram. The alumina support when formed into pellets has an apparent bulk density of from 0.60 gm/cc to 0.85 gm/cc, pore volumes of from 0.45 ml.g to 0.70 ml/gm and surface areas of from 50 m$^2$/g to 500 m$^2$/gm. In the Example an alumina support extrudate having a surface area of 194 m$^2$/gm and a total pore volume of 0.60 cc/gram was used to produce a palladium on chlorided alumina catalyst. This catalyst was used to treat the 650° to 900° F. cut of oil obtained from the first stage hydrogenation zone of the process.

U.S. Pat. No. 2,838,444 teaches an improved reforming catalyst comprising platinum or alumina. An acidic promoter such as fluorine can be added to enhance hydrocracking activity. The isomerization of normal paraffins to isoparaffins is defined in the patent as a reforming operation. The alumina is described as having a pore volume distribution or determined by nitrogen adsorption in the range of 0.1 to about 0.5, preferably 0.15 to 0.3 cc/gram of their pore volume in pores greater than about 100Å, and surface areas of about 300 sq m/g (when the monohydrate has a crystallite size of about 30 to 40Å) or 60 to 250 sq m/gram (when the crystallite size of the uncalcined trihydrate is in the range of about 300 to 1000Å). After calcination of the trihydrate the crystallite size is predominantly in the range of about 35 to 65Å and the surface area is in the range of about 350 to 500 or more sq m/gram. Average crystallite size of the trihydrate phase determined dry before calcination and the pore size distribution after calcination may be an indication of base structure accessibility related to catalyst activity and stability.

U.S. Pat. No. 3,206,525 teaches a process for isomerizing paraffinic hydrocarbons and recites that the preferred catalyst base material is an activated or gamma alumina as described in U.S. Pat. No. 2,838,444.

U.S. Pat. No. 3,963,601 teaches hydrocracking using a catalyst comprising an alumina-silica support, a Group VIII and Group VIB metallic component and fluorine. A catalyst useful in this process would have a surface area of about 50 to about 700 sq m/gram, a pore diameter of about 20 to 300Å, a pore volume of about 0.10 to about 0.80 ml/g, and an apparent bulk density in the range 0.10 to 0.30 gm/cc.

GP 1,493,928 teaches a process for producing lube oils of high VI by the catalytic hydrocracking of a mixture of heavy hydrocarbons. Suitable catalyst contain one or more Gp VI-B, VII-B or VIII metals deposited in a refractory metal oxide. Promoters such as fluorine, bromine or phosphorus can also be used. If the pore volume quotient of the xerogel is less than 0.5, the catalyst is prepared by incorporation of the metals and at least part of the fluorine into the alumina hydrogel and drying and calcining the composition, provided that the fluorine is incorporated into the alumina hydrogel in sufficient quantity that from the fluorine containing alumina hydrogel a perogel with a pore volume quotient of at least 0.5 can be obtained by drying at 120° C. and calcining at 550° C. Catalyst surface area is not mentioned.

U.S. Pat. No. 3,794,580 teaches a hydrocracking process using a catalyst comprising a Group VI-B, VII-B and VIII metal deposited on a refractory metal oxide support, preferably promoted with a halogen or phosphorus. The process is then run in the presence of added ammonia or other nitrogen containing compound which is converted into ammonia under operating conditions. The alumina has a compacted bulk density of 0.75 to 1.6 g/ml and a pore volume of 0.15 to 0.5 ml/gm.

U.S. Pat. No. 3,709,817 describes a process for the selective hydrocracking and isomerization of paraffin hydrocarbons using added water as a hydrocracking moderator. The catalyst comprises a Group VII-B or VIII metal on fluorided alumina. The alumina has a surface area of from 50 to 800 sq m/gram as determined by the BET method. Preferably the alumina is eta or gamma alumina having a surface area of 50 to 400 sq m/gram (see also.U.S. Pat. No. 3,717,586).

U.S. Pat. No. 4,588,701 teaches a catalytic cracking catalyst comprising a mixture of zeolite and an inorganic refractory metal oxide combined with a fluoro salt, ammonium exchanging the product to produce a catalyst having less than 0.3 wt % $Na_2O$ and optionally adding an effective amount of cation selected from the rare earths. In describing the inorganic refractory metal oxide component of this mixture, the oxide is identified as being preferably alumina and having a surface area, as measured by the BET method of greater than 20 $m^2/g$ more preferably about 100 to 300 $m^2/gram$ and having a pore volume greater than 0.35 cc/gram.

U.S. Pat. No. 3,692,697 describes a fluorided metal-alumina catalyst useful for isomerization. The catalyst comprises alumina having associated with it a hydrogenating metal component selected from the group consisting of Group VII-B and VIII and about 0.5 to 15 wt % fluorine. The alumina is described as having a surface area of 50 to 800 $m^2/gram$ as determined by the BET method. No mention is made of pore volume.

U.S. Pat. No. 3,268,439 teaches a paraffin isomerization process which uses a catalyst comprising a platinum group metal on alumina and at least 1 wt % fluorine, the fluorine being present in an amount of from $1.2 \times 10^{-4}$ to $3.4 \times 10^{-4}$ grams/sq meter. The alumina used is one of high surface area, a surface area of at least 300 sq m/gram, preferably at least 400 sq m/gram as determined by the BET method being desirable. Again, there appears to be no mention of pore volume.

U.S. Pat. No. 3,121,696 teaches a method for preparing a hydrocarbon conversion catalyst. The catalyst comprises a Group VIII metal on alumina containing combined fluorine. The alumina is a high surface material having a surface area of at least 50 $m^2/gm$ but higher surface areas of about 100 to about 300 sq $m^2/gram$ are preferred. It appears that porosity is not discussed.

U.S. Pat. No. 3,830,723 teaches a process for preparing high VI lube oil by Hydrocracking a wax. The process uses a fluorided alumina catalyst containing mixed metal sulfides of nickel and/or cobalt and in addition molybdenum and/or tungsten. In Example 1 Catalyst A had a pore volume of 0.44 ml/g and a specific surface area of 117.1 $m^2/g$. Catalyst B had a pore volume of 0.23 ml/g and a specific surface area of 63 $m^2/g$. Catalyst E, F and G are reportedly made using an alumina xerogel with a compacted bulk density between 0.75 and 1.6 g/ml and a pore volume between 0.15 and 0.5 ml/g.

U.S. Pat. No. 3,486,993 teaches the catalytic production of low pour point lubricating oils. The process is improved if the aromatics content of the feed is reduced via hydrogenation prior to the isomerization step. The hydrogenation catalyst comprises Group VIII metal on alumina. The alumina is described as loading high porosity and surface area to the composite.

DESCRIPTION OF THE INVENTION

It has been discovered that wax can be isomerized in a high yield into liquid products, preferably and especially into high viscosity index. Low pour point lubricating oil base stocks and blending stocks using a catalyst comprising a catalytic metal component selected from the group consisting of Group VIB metals, Group VIII metals and mixtures thereof, preferably Group VIII metals and mixtures thereof, more preferably noble Group VIII metals and mixtures thereof, most preferably platinum deposited on a fluorided, high porosity high surface area refractory metal oxide support, preferably predominantly alumina (i.e., at least about 50 wt % alumina), most preferably gamma or eta alumina. The catalytically active metal component is present in the range of about 0.01 to 5.0 wt % metal, preferably about 0.1 to 1.0 wt % metal. The fluorine content of the support is about 10.0 wt % and less, preferably about 0.11 to 2.0 wt % fluorine. The refractory metal oxide support is characterized by possessing a high porosity, expressed in terms of pore volume, of at least about 0.50 cc/gram preferably at least about 0.55 cc/gm, more preferably at least about 0.65 cc/gm and a high surface area (in $m^2/gm$), the surface area of the finished catalyst being such that when the porosity value (in cc/gm) is multiplied by the surface area the product obtained is at least about 107, preferably at least about 110, more preferably at least about 115, most preferably at least about 120. In absolute terms the minimum surface area of the support is about 140 $m^2/g$. By observing the aforesaid relationship between porosity and surface area the finished catalyst never possesses both the minimum porosity and minimum surface area simultaneously. Expressed differently, in the finished catalyst, when the porosity is about 0.50 cc/g the surface area must be at least about 214 $m^2/g$ whereas when the porosity is about 0.7 cc/gm the surface area can be 152.8 $m^2/g$. Similarly, if a support with the minimum surface area of about 140 $m^2/g$ is employed, the porosity of that support must be at least 0.764 cc/gm.

That the larger pore, high porosity alumina base catalysts of the present invention can produce high yields of high VI low pour point product is surprising because previous results have shown that wax isomerization catalysts with widely differing pore structures have generated products of comparable VI. See Table B which compares the performance of Pt-Zeolite Beta (see U.S. Pat. No. 3,308,069) having micropores of about 7 Å diameter with a Pt-fluorided alumina catalyst (not one within the scope of this invention) with a median pore radius of 35 Å on a synthetic Fischer-Tropsch wax. The synthetic Fischer-Tropsch wax is described in Table A.

Products were generated at two conversion levels (58 and 84 wt % conversion of 370° C.+ wax) over the Pt Zeolite Beta catalyst and at an intermediate level (69 wt % 370° C.+wax conversion) over the Pt fluorided alumina catalyst. The total liquid products were distilled into narrow boiling range fractions then dewaxed, resulting in the dewaxed oil products shown in Table A. It is seen that the products from each catalyst do not have quite the same viscosities or pour points. Lower pour point isomerate oils generally have lower VI's associated with the removal of the less branchy paraffin species. However, even taking this into account, there is no doubt that the quality of products in terms of VI from microporous zeolite Beta is as good as or better than product from the Pt fluorided γ alumina catalyst. Zeolite Beta is not necessarily the better catalyst, however, because the yields of isomerate oil are low compared with Pt fluorided alumina catalyst but it does snow that even microporous catalysts can yield high VI product

TABLE A

| HCS Wax as Received | |
| --- | --- |
| Pour Point, °C. | +99 |
| Cloud Point, °C. | +116 |
| Flash Point, °C. | +94 |
| Fire Point, °C. | +120 |
| Melting Point (From Supplier), °C. | |
| Hivac Distillation, W %, Grams | |
| I-370° C. | 21.1% |
| 370° C.+ | 78.9% |

TABLE B

| | MICROPOROUS CATALYST PRODUCTS HIGH VI BASE OIL | | | |
| --- | --- | --- | --- | --- |
| Catalyst | 1.3% Pt Zeolite Beta | | 0.6% Pt, 8.5% F. on α Al₂O₃ Surface Area 180 m²/g Pore Volume .42 cc/gm | |
| 370° C.+ Wax Conversion/Feed, Wt % | 58 | 84 | 69 | 69 |
| Hivac Temps., °C. | 460 to 474 | 524 to 538 | 454 to 468 | 510 to 524 |
| Dewaxing Conditions Solvent, W/W | 100% MIBK | Toluene/MIBK | 100% MIBK | 100% MIBK |
| Solvent:Oil, W/W | 4:1 | 5:1 | 4:1 | 4:1 |
| Filter Temp., °C. | −21 | −21 | −30 | −30 |
| Wt % Dry Wax | 31.3 | 36.8 | 19.6 | 25.4 |
| DWO Physical Properties Viscosity, | | | | |
| cSt, 40° C. | 18.82 | 41.56 | 19.97 | 36.86 |
| 100° C. | 4.40 | 7.71 | 4.50 | 6.93 |
| SUS, 37.8° C. | 98 | 211 | 104 | 188 |
| Viscosity Index | 150 | 157 | 143 | 151 |
| Pour Point, °C. | −12 | −9 | −20 | −21 |

In this light it is, therefore surprising that alumina porosity should influence VT, especially because the cross section of the reacting waxy species is quite small relative to the diameter of the vast majority of pores in alumina.

The catalysts of the present invention are useful for isomerizing wax to liquid products. The wax which is isomerized can be any natural petroleum wax identified as slack wax, recovered by the solvent dewaxing of petroleum hydrocarbon feeds, or synthetic wax such as that obtained by the Fischer-Tropsch process.

Natural waxes such as the aforementioned slack wax can contain appreciable amount of oil. It is desirable to deoil the slack wax before the isomerization process. Slack waxes containing anywhere between 0 to 50% oil can be isomerized, although the more desirable oil content is about 35% oil and less. Natural waxes also can contain heteroatom compounds, that is compounds containing nitrogen and sulfur. Such heteroatom compounds are known to deactivate noble metal containing isomerization catalysts. Before isomerizing such heteroatom containing wax feeds it is necessary to reduce the sulfur and nitrogen content of the feed. These heteroatom containing wax feeds should be hydrotreated to reduce the level of heteroatom compounds to levels commonly accepted in the industry as tolerable for feeds to be exposed to isomerization catalysts. Such levels will typically be a nitrogen content of about 1 to 5 ppm and a sulfur content of about 1 to 20 ppm, preferably 2 ppm or less nitrogen and 5 ppm or less sulfur. The hydrotreating step will employ typical hydrotreating catalysts such as Co/Mo, Ni/Mo, or Ni/Co/Mo on alumina under standard, commercially accepted conditions, e.g., temperature of about 280° C. to 400° C., space velocity of about 0.1 to 2.0 V/V/hr, pressure of from about 500 to 3,000 psig H₂ and hydrogen gas rates of from about 500 to 5000 SCF/bbl.

As previously stated, synthetic waxes such as those obtained from Fischer-Tropsch synthesis processes can also be used as the wax feed to the isomerization process. Because such waxes are usually free of sulfur and nitrogen compounds, hydrotreating to remove S and N is not needed. Synthetic waxes, however, may contain other polar or oxygenated components and trace metals which may be removed prior to isomerization to improve product daylight and oxidation stability. The waxes are also very high melting and should be softened somewhat to facilitate handling prior to isomerization. These two goals can be accomplished by treating the synthetic wax with a hydrotreating catalyst and hydrogen to reduce the oxygenate and trace metal levels of the wax and to partially hydrocrack/isomerize the wax to lighter and lower melting point materials. This pretreatment of synthetic Fischer-Tropsch waxes is one aspect of the invention taught in U.S. Pat. No. 4,943,672.

Isomerization over the catalyst is conducted at a temperature of 300° C.–400° C., 500 to 3000 psi H₂; 1000–10,000 SCF/bbl, H₂, and 0.1–10.0 LHSv, preferably 320° C.–385° C., 1000–1500 psi H₂, and 1–2 V/V/hr.

An integrated process to produce lube base stock oils or blending stocks by isomerizing waxes is disclosed in U.S. Pat. No. 5,059,229.

The desired conversion of wax to a finished grade lube oil is dictated by two factors: (1) the ability of the dewaxing unit to process the unconverted wax remaining in the isomerate and (2) maximum production of dewaxed oil boiling in the lube oil range, e.g., about 330° C.+, preferably 370° C.+; thus high levels of conversion to non lube boiling range products are undesirable. Consequently, a balance must be struck between low conversions (favoring lubes production but sending too much residual wax to the dewaxer) and high conversion (sending law levels of wax tot he dewaxer but producing fuels at the expense of lubes).

In U.S. Pat. No. 5,059,299 a process is disclosed closed of the production of non-conventional lube oil base stocks or blending stocks of very low pour point, pour point of about $-21°$ C. or lower, preferably about $-24°$ C. or lower, said pour points being achieved by conventional dewaxing techniques without resort to deep dewaxing procedures, and very high viscosity index (VI), VI's of about 130, and higher, preferably 135 and higher by the isomerization of waxes over isomerization catalysts in an isomerization unit to a level of conversion such that about 40% and less, preferably 15-35%, most preferably 20-30% unconverted wax remains in the fraction of the isomerate boiling in the lube boiling range sent to the dewaxing unit calculated as (unconverted wax)/(unconverted wax+dewaxed oil)$\times 100$. For the purposes of that calculation the amount of unconverted wax in the 370° C.+ oil fraction is taken to be the amount of wax removed or recovered from said oil fraction upon dewaxing.

Following isomerization the isomerate is fractionated into a lubes cut and fuels cut, the lubes cut being identified as that fraction boiling in the 330° C.+ range, preferably the 370° C.+ range or even higher. The lubes fraction is then dewaxed to a pour point of about $-21°$ C. or lower. Dewaxing is accomplished by techniques which permit the recovery of unconverted wax, since in the process of the present invention this unconverted wax is recycled to the isomerization unit. It is preferred that this recycle wax after the removal of the solvent used in the dewaxing operation be recycled to the isomerization reactor. A separate stripper can be used to remove entrained dewaxing solvent or other contaminants.

Solvent dewaxing utilizes typical dewaxing solvents such as $C_3 \alpha C_6$ ketones (e.g., methyl ethyl ketone, methyl isobutyl ketone and mixtures thereof), $C_6$-$C_{10}$ aromatic hydrocarbons (e.g., toluene) mixtures of ketones and aromatics (e.g., MEK/toluene), auto-refrigerative solvents such as liquified, normally gaseous $C_2$-$C_4$ hydrocarbons such as propane, propylene, butane, butylene, etc., at filter temperature of $-25°$ C. to $-30°$ C. It has been discovered that the preferred solvent to dewax the isomerate under miscible conditions and thereby produce the highest yield of dewaxed oil at a high filter rate is a mixture of MEK/MIBK (20/80 V/V) used at a temperature in the range of $-25°$ C. to $-30°$ C. Pour points lower than $-21°$ C. can be achieved using lower filter temperatures and other ratios of said solvent. Further, when dewaxing isomerate made from a microwax, e.g., Bright Stock slack wax, it has been found to be preferred that the fraction of the isomerate which is dewaxed is the "broad heart cut" identified as the fraction boiling between about 330° C. to 600° C., preferably 370° C.-600° C. When processing wax fractions higher than 1050° F.+ the heavy bottoms fraction contains appreciable unconverted wax so they can be recycled to the hydrotreating unit.

It has also been found that prior to fractionation of the isomerate into various cuts and dewaxing said cuts, the total liquid product (TLP) from the isomerization unit can be advantageously treated in a second stage at mild conditions using the isomerization catalyst or a noble Group VIII on refractory metal oxide catalyst to reduce PNA and other contaminants in the isomerate and thus yield an oil of improved day-light stability. This aspect is covered in U.S. Pat. No. 5,158,671 Cody, MacDonald, Eadie and Hamner.

In that embodiment, the total liquid product is passed over a charge of the isomerization catalyst or over noble Group VIII on, e.g., gamma alumina catalyst under mild conditions, e.g., a temperature in to range of about 170° C.-270° C., preferably about 180° C. to 220° C. at a pressure of about 300-1500 psi $H_2$, preferably about 500 to 1000 psi $H_2$, a hydrogen gas rate of about 500 to 10,000 SCF/bbl, preferably 1000 to 5000 SCF/bbl and a flow velocity of about 0.25 to 10 V/V/hr, preferably about 1-4 V/V/hr.

The total liquid product can be treated under these mild conditions in a separate, dedicated unit or the TLP from the isomerization reactor can be stored in tankage and subsequently passed through the isomerization reactor under said mild conditions. It has been found to be unnecessary to fractionate the total liquid product prior to this mild second stage treatment. Subjecting the whole TLP to this mild second stage treatment produces an oil product which upon subsequent fractionation and dewaxing yields a base oil exhibiting a high level of daylight stability and oxidation stability.

In preparing the catalysts of the present invention the catalytically active metal, preferably noble Group VIII metal is deposited in the high porosity, high surface area refractory metal oxide support by any convenient method such as soaking, spraying, incipient wetness, solution exchange, etc., followed by drying, typically conducted at 120° C. to 150° C., and calcination, typically conducted at 350° C. to 500° C., preferably 450° C. to 500° C., typically for from 1 to 5 hours. Suitable sources of noble Group VIII metal include chloroplatinic acid and fluoro platinic acid. Metal loading in from 0.01 to 5 wt %, preferably 0.1 to 1.0 wt %, most preferably 0.2 to 0.6 wt %. The preferred metal is platinum.

Following metal deposition, drying and calcination, the catalyst is fluorided. Total fluoride levels of 0.01 to about 2.0 wt % are produced using fluoride solution, e.g., HF or $NH_4F$ solutions, preferably aqueous $NH_4F$ solutions. Following fluoriding the catalyst is dried. Fluoriding is conducting using any convenient method such as soaking, spraying, incipient wetness, etc.

The catalyst is usually activated prior to use by heating in a hydrogen atmosphere (e.g., pure or plant hydrogen (i.e., ~60 to 70 vol % $H_2$)) to from 350° C. to 500° C. for from 1 to 48 hours or longer A typical hydrogen activation profile may be a period of 2 hours to go from room temperature to 100° C. with the catalyst being held at 100° C. from 0 to 2 hours, then the temperature is raised from 100° C. to about 350° C. to 500° C., preferably 350° C. to 450° C. over a period of 1 to 50 hours with a hold at the final temperature of from 0 to 24 hours, (preferably 24 hours). Similarly, hydrogen activation can be accomplished by going from room temperature to the final temperature of 350° C. to 500° C. preferably 350° C. to 450° C. in 1 to 50 hours.

The present invention is demonstrated below in the following non-limiting examples.

EXAMPLES

In the following Examples catalysts within the scope of the invention are demonstrated and compared against other wax isomerization catalyst. Two slack waxes derived from 600N distillate streams were employed as feed and they are described more fully in Table 1 below.

TABLE 1

|  | 600 N Slack Wax (Feed A) | 600 N Slack Wax (Feed B) |
|---|---|---|
| Oil content, wt % | 20 | 16 to 17 |
| Sulphur, wt % | 0.06 | 0.07 |
| Total Nitrogen, wppm | 9 | 25 |
| Density @ 15° C., g/cc | 0.8342 | 0.8367 |
| GCD, 1 vol % | | |
| 1%, °C. | 389 | 397 |
| 5%, °C. | 423 | 437 |
| 10%, °C. | 439 | 454 |
| 50%, °C. | 488 | 501 |
| 95%, °C. | 549 | 563 |

In characterizing the catalysts, surface area was measured by the BET method using $N_2$ as the adsorbate. Pore volume and particle density were measured by Hg porosimetry. The median pore diameter is taken as the calculated diameter at which half of the pores are filled on a volume basis in the Hg porosimetry experiment, using a Hg contact angle of 140° and a Hg surface tension of 474 ergs/cm$^2$.

Each catalyst was prepared according to the general procedure of loading platinum, in the form of chloroplatinic acid, onto the alumina supports, calcining the metal loaded support followed by fluorided using an aqueous solution of ammonium fluoride ($NH_4F$) after which the catalyst was calcined at 400° C.

The high purity (reformer grade) alumina bases in catalysts A to F (below) were prepared by Akzo and are all 1/20" trilobe extrudates. Catalyst C was derived from a semi-commercial scale (3000 lb.) run. Catalyst G was a laboratory scale preparation. The base alumina of Catalyst G was made into 1/16" cylindrical extrudates prior to loading Pt and F. The properties of the catalyst are shown in Table 2. Inspections on catalysts A to F were performed at Akzo and on catalyst G in the laboratory facilities of the investigators.

Catalysts E, F and G are the catalysts of the invention; catalysts A and B are representative of the "low fluoride" catalysts disclosed in U.S. Pat. No. 4,906,601.

The two slack wax feeds previously identified were used. For each of the above catalysts, the isomerization experiment was performed in a two-reactor system using a commercial hydrotreating catalyst (KF-840 a Co/Mo/$Al_2O_3$ catalyst) in the first reactor, stripping the $H_2$ gas stream free of $NH_3$ and $H_2S$, then introducing polar free $H_2$ and liquid feed to the isomerization reactor (the second reactor). The hydrotreating catalyst was used at a feed rate of 0.7 v/v/hr, 340° C., 1000 psi $H_2$ and 2500 SCF/B, conditions which minimize wax conversion, but sufficient to reduce feed nitrogen to less than 1 ppm.

The hydrotreating and isomerization catalyst were charged to the reactors and activated according to the following procedures. All catalysts were tested at low mass velocity ($\sim$160 lb/hr/ft$^2$).

Reactor 1 (R1) contained 150 cc of catalyst and reactor 2 (R2) contained 60 cc of catalyst. Both reactors were tested at the maximum operating pressure of 6.9 MPa, using nitrogen then hydrogen. The catalyst was then heated in hydrogen at a gas rate of 2.3 cubic ft/hr at 2.1 MPa pressure, upflow through R1 and R2 in series in the following way:

R1, increase temperature at 8° C./hr to 350° C., hold for 1 hour.

R2, increase temperature at 8°C./hr to 200° C., hold at 200° C.

The pressure was then reduced to 0.69 MPa, while maintaining temperature and gas rate. Both reactors were pressure tested under hot conditions using hydrogen at the maximum operating pressure of 6.9 MPa, after which a hydrogen flow at 2.3 cubic feet/hr. at 6.9 MPa up flow through $R_1$ and $R_2$ in series was established. $R_1$ was then cooled to operating temperatures but $R_2$ was maintained at 200° C.

The isomerization catalyst was operated at 1.0 v/v/hr, 1000 psi $H_2$ and 2500 SCF/B and at temperatures needed to convert about 20% of the feed to 370° C.-(fuels) product. Actual temperatures used are reported in Tables 3 A&B.

Base oil products were generated by topping the total liquid product from isomerization, at 390° C. and 410° C. (atmospheric equivalent temperatures) using a Model C Hivac distillation apparatus. These waxy topped fractions were then dewaxed at a filter temperature of −24° C. using a 100% MIBK at a solvent to waxy oil ratio of 3:1.

TABLE 3A

| ISOMERIZATION OPERATING CONDITIONS AND CATALYST PERFORMANCE ON FEED A | | | |
|---|---|---|---|
| Catalyst | A | B | E |
| Reactor Temp, °C. | 320 | 318 | 327 |

TABLE 2

| CATALYST PROPERTIES | | | | | | | |
|---|---|---|---|---|---|---|---|
| Catalyst | A | B | C | D | E | F | G |
| Particle dia (inch) | 1/20 | 1/20 | 1/20 | 1/20 | 1/20 | 1/20 | 1/16 |
| Pt, wt % | 0.30 | 0.30 | 0.30 | 0.29 | 0.30 | 0.30 | 0.28 |
| F., wt % | 1.0 | 1.0 | 1.0 | 1.0 | 1.0 | 1.0 | 1.0 |
| S Area, m$^2$/g | 182 | 185 | 194 | 173 | 200 | 209 | 180 |
| Pore Volume, cc/gm | 0.49 | 0.45 | 0.54 | 0.55 | 0.57 | 0.60 | 0.70 |
| Median pore dia, Å | 79 | — | 84 | 97 | 87 | 87 | 140 |
| Particle density, gm/cc | 1.30 | — | 1.23 | — | 1.17 | 1.11 | — |
| Pore Vol × Surface Area | 89.18 | 83.25 | 104.76 | 95.15 | 114 | 125.4 | 126 |

| | | | | | | |
|---|---|---|---|---|---|---|
| Conversion to 370° C.− | 18.8 | | 19.0 | | 21.0 | |
| Topping Temp. for product, °C. | 390 | 410 | 390 | 410 | 390 | 410 |
| Dewaxed Oil Properties | | | | | | |
| Yield on Feed, wt % | 51.1 | 47.5 | 48.9 | 46.5 | 52.8 | 48.7 |
| Viscosity @ 100° C., cSt | 5.66 | 5.86 | 5.63 | 5.89 | 5.57 | 5.81 |
| Viscosity Index | 138.2 | 137.5 | 137.2 | 137.7 | 142.6 | 142.4 |
| Pour Point, °C. | −20 | −22 | −21 | −19 | −18 | −20 |
| Noack Volatility, % (calculated from GCD) | 10.3 | 8.4 | 11 | 8.2 | 10.4 | 8.1 |

TABLE 3B

ISOMERIZATION OPERATING CONDITIONS AND CATALYST PERFORMANCE ON FEED B

| Catalyst | C | | D | | E | | F | | G | |
|---|---|---|---|---|---|---|---|---|---|---|
| Reactor Temp, °C. | 332 | | 322 | | 332 | | 332 | | 343 | |
| Conversion to 370° C.— | 21.7 | | 20.8 | | 17.5 | | 21.3 | | 18.3 | |
| Topping Temp. for product, °C. | 390 | 410 | 390 | 410 | 390 | 410 | 390 | 410 | 390 | 410 |
| Dewaxed Oil Properties | | | | | | | | | | |
| Yield on Feed, wt % | 51.1 | 48.4 | 48.4 | 45.2 | 55.7 | 53.6 | 53.8 | 51.6 | 56.8 | 53.6 |
| Viscosity @ 100° C., cSt | 5.91 | 6.10 | 5.81 | 6.03 | 5.87 | 6.04 | 5.82 | 5.97 | 5.82 | 6.00 |
| Viscosity Index | 139.3 | 138.7 | 141.5 | 141.1 | 142.5 | 142.5 | 141.5 | 143.5 | 142.0 | 141.5 |
| Pour Point, °C. −20 | −20 | −20 | −17 | −18 | −20 | −20 | — | — | −20 | −22 |
| Noack Volatility, % (calculated from GCD) | 9.5 | 7.2 | 9.8 | 7.7 | 9.5 | 7.2 | 9.0 | 7.6 | 9.2 | 7.5 |

The properties of the base oil products from the two slack wax feeds are shown in Tables 3A and 3B. In all cases, products from catalysts A, B, C and D have lower quality (lower VI) and/or are made in lower yield than products from catalysts E, F and G. For example, in Table 3A, catalyst E having both a high pore volume (0.57 cc/gm) and surface area (200 m²/gm) produces higher quality products than either A or B, at equal or higher yield. Catalysts A and B both have lower pore volumes than E.

In Table 3B, catalysts E and F, with a combination of high porosity (0.57, 0.60 cc/gm) and high surface area (200, 209 m²/gm), and catalyst G having very high porosity (0.70 cc/gm) though not as high surface area (180 m²/gm), are seen to be superior to catalysts C and D that have only moderate pore volume (0.54, 0.55 cc/gm) and moderate surface areas (194, 173 m²/gm).

On feed B, catalysts E, F and G exhibit both higher yield and quality versus catalysts C and D. For a fixed viscosity base oil product of 5.80 cSt, catalysts C, E, F and G show a clear advantage over the other three catalysts. The performance of catalyst G is particularly impressive because it has been previously shown that catalysts having low fluoride contents (0.1 to 2 wt %) have better selectivity when particle size is reduced (see U.S. Pat. No. 4,906,601). Because catalyst G has 1/16" particle diameter, it is reasonable to suppose that even better yields might have been expected had it been composited as 1/20" trilobes like each of the other catalysts in the set.

Catalysts E, F and G are distinct from catalysts A, B and C because they have higher pore volumes. Pore volumes greater than about 0.55 cc/gm, preferably greater than about 0.55 cc/gm are desirable.

Catalyst D illustrates that there is an additional requirement for catalysts with pore volume in the range 0.50 to 0.60 cc/gm—that surface area be at least 180 m²/gm to 215 m²/gm, so that pore vol. x surface area is at least 107.0. Even though it has acceptable pore volume, the lower surface area is believed responsible for the poorer selectivity of this catalyst.

In the isomerization process, it is believed that the combination of high quality and good yield is achieved with low fluoride content catalysts when pore volume is high and surface area is high, such that the product obtained by multiplying pore volume times surface area is at least 107, preferably at least 110, more preferably at least 115, most preferably at least 120. A related compositional feature is the particle density. Superior catalysts have particle densities below 1.20 gm/cc.

What is claimed is:

1. A process for the catalytic isomerization of wax into liquid products of high viscosity index and low pour point in high yield comprising passing wax over a high porosity, high surface area catalyst comprising a catalytically active metal component on a fluorided refractory metal oxide support wherein the catalyst in its finished form has a porosity, expressed in terms of pore volume, of at least about 0.50 cc/gram, and a surface area in m²/gm, such that the product of the porosity and the surface area is at least about 107, said contacting of the wax with the catalyst being conducted in the presence of hydrogen and under isomerization conditions of elevated temperature and pressure.

2. The process of claim 1 wherein the wax which is isomerized is hydrotreated prior to the isomerization step.

3. The process of claim 1 wherein isomerization is conducted at a temperature of 300° to 400° C., a pressure of 500 to 3000 psi, a hydrogen gas treat rate of 1000 to 10,000 SCF/bbl, $H_2$ and a LHSV of 0.1 to 10.0.

4. The process of claim 1 wherein the catalyst in finished form has a porosity, expressed in terms of pore volume, of at least about 0.50 cc/gm and a surface area in m²/gm such that the product of porosity and the surface area is at least about 110.

5. The process of claim 1 wherein the catalyst, in finished form, has a porosity, expressed in terms of pore volume, of at least about 0.50 cc/gm and a surface area in m²/gm such that the product of porosity and the surface area is at least about 115.

6. The process of claim 1 wherein the catalyst, in finished form, has a porosity, expressed in terms of pore volume, of at least about 0.50 cc/gm and a surface area in m²/gm such that the product of porosity and the surface area is at least about 120.

7. The process of claim 1, 4, 5 or 6 wherein the catalyst porosity, expressed in terms of pore volume, is at least about 0.55 cc/gm.

8. The process of claim 1, 4, 5 or 6 wherein the catalyst porosity, expressed in terms of pore volume is at least about 0.65 cc/gm.

9. The process of claim 1, 4, 5 or 6 wherein the fluorine content of the catalyst is in the range 0.01 to 10 wt %.

10. The process of claim 1, 4, 5 or 6 wherein the fluorine content of the catalyst is in the range 0.1 to 2 wt %.

11. The process of claim 1, 4, 5 or 6 wherein the refractory metal oxide support of the catalyst is gamma or eta alumina.

12. The process of claim 9 wherein the refractory metal oxide support of the catalyst is gamma or eta alumina.

13. The process of claim 10 wherein the refractory metal oxide support of the catalyst is gamma or eta alumina.

14. The process of claim 1, 2, 3, 4, 5 or 6 wherein the catalyst comprises platinum on a gamma or eta alumina support fluorided to a level of about 0.01 to 10 wt %.

* * * * *